United States Patent Office 3,544,535
Patented Dec. 1, 1970

3,544,535
NOVEL CARBINOL AND DERIVATIVES THEREOF
Everett E. Gilbert, Morris Township, Morris County, N.J., and Basil S. Farah, West Seneca, N.Y., assignors to Allied Chemical Corporation, New York, N.Y., a corporation of New York
No Drawing. Filed July 26, 1965, Ser. No. 475,005
Int. Cl. C08f 3/42
U.S. Cl. 260—89.5                 9 Claims

ABSTRACT OF THE DISCLOSURE

Production of 2-(pentafluorophenyl)hexafluoroisopropanol, its acrylate and methacrylate esters and polymers derived from the acrylate and methacrylate esters, the polymers being useful as textile impregnants.

---

The present invention relates to the production of a novel carbinol, 2-(pentafluorophenyl)hexafluoroisopropanol, its acrylate and methacrylate esters and polymers derived from the acrylate and methacrylate esters.

Polymers prepared from acrylate and methacrylate esters have been long recognized as thermoplastic materials whose utility is wide and varied. The polymers derived from the acrylate and methacrylate esters of this invention, when used as textile impregnants, have been found to exhibit unpredictable hydrophobic properties.

Accordingly, one of the objects of the invention is to provide 2-(pentafluorophenyl)hexafluoroisopropanol and a process for its preparation. A further object of the invention is to provide acrylate and methacrylate esters of 2-(pentafluorophenyl)hexafluoroisopropanol. A still further object is to provide polymers derived from the acrylate and methacrylate esters. Other objects and advantages will become apparent from the following description.

2-(pentafluorophenyl)hexafluoroisopropanol and its acrylate and methacrylate esters have the general formula:

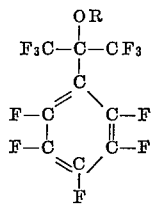

wherein R is a member of the group consisting of hydrogen, acrylyl and methacrylyl.

2 - (pentafluorophenyl)hexafluoroisopropanol is prepared by the reaction of pentafluorophenyl magnesium bromide with hexafluoroacetone, followed by hydrolysis of the reaction product. The reactions occurring may be represented by the following equations:

(1) $C_6F_5MgBr + (F_3C)_2CO \longrightarrow C_6F_5C(CF_3)_2OMgBr$ (2) $C_6F_5C(CF_3)_2OMgBr \xrightarrow{H^+} C_6F_5C(CF_3)_2OH + MgBr$ The pentafluorophenyl magnesium bromide, a Grignard reagent, is readily prepared by the known method of reacting pentafluorobromobenzene with magnesium metal in the presence of iodine in a convenient reaction medium.

According to the invention, 2-(pentafluorophenyl)hexafluoroisopropanol is generally prepared by adding hexafluoroacetone to a solution of pentafluorophenyl magnesium bromide in a suitable reaction medium. The resulting oxymagnesium bromide intermediate is then hydrolyzed with a dilute mineral acid to form an organic layer containing the carbinol. Recovery of the carbinol is effected by conventional means, as by separating the organic layer and subjecting it to distillation.

Although reaction temperatures of about −28° C. to +65° C. and higher may be used, it is preferred to employ temperatures of about 0° C. to 20° C. The mol ratio of pentafluorophenyl magnesium bromide to hexafluoroacetone may vary widely, as from about 0.75 to 1.25 mols of the bromide per mol of hexafluoroacetone. It is preferred, however, that a substantially stoichiometric mol ratio of about 1 to 1 be employed. Any solvent which is inert under the conditions of the reaction and is a solvent for the reactants may be employed as reaction medium. The preferred solvents are ethers, such as diethyl ether and tetrahydrofuran, or aromatic hydrocarbons, such as benzene, toluene and xylene.

Upon hydrolysis of the reaction mixture with a dilute mineral acid, such as HCl or $H_2SO_4$, an organic layer containing the carbinol is formed. Recovery and purification of the carbinol may be effected by employing conventional procedures. For example, the carbinol may be extracted with a suitable organic solvent such as methylene chloride, benzene and ethyl ether. The extract may then be washed with water, dried and purified, as by distillation.

The acrylate and methacrylate esters of the present invention are prepared by reacting 2-(pentafluorophenyl)hexafluoroisopropanol with an acrylic compound of the formula

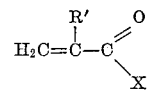

wherein X is a member selected from the group consisting of chlorine, hydroxy and methoxy and R' is a member selected from the group consisting of hydrogen and methyl. It is to be understood, of course, that the acrylic reactant may also be employed in the form of its anhydride.

The mol ratio of the reactants is not critical, and from about 0.1 mol to about 10 mols of carbinol per mol of the acrylic reactant may be employed to secure the desired reaction product. It is preferred, however, that a substantially stoichiometric mol ratio of about 1 to 1 be employed. If desired, a suitable organic solvent may be employed as diluent. Generally speaking, any organic solvent may be employed provided it is inert under the conditions of the reaction and is a solvent for the reactants. Typical solvents include benzene, 1,2-dichloroethane and tetrachloroethylene. In order to minimize reaction time, an adjuvant such as trifluoroacetic anhydride, pyridine, quinoline, triethylamine and N,N'-dimethylaniline, may be employed. The amount of adjuvant is not critical and may range from 1 to 200% by weight based on the amount of carbinol charged. The reaction temperature may range from about room temperature up to the boiling point of the reaction mixture. In preferred operation, a temperature ranging from about 20° C. to 100° C. is utilized. Recovery and purification of resulting acrylate or methacrylate ester may be effected by employing conventional procedures. For example, the reaction mixture may be simply cooled, washed with an aqueous alkaline solution, dried and then distilled.

Polymerization of the acrylate and methacrylate esters is accomplished by maintaining the ester at a temperature in the range of about 20° C. to 100° C. using a polymerization catalyst, actinic radiation or a combination thereof. Suitable polymerization catalysts are illustrated by organic free radical generators such as potassium persulfate and benzoyl peroxide, or other peroxidic materials.

The following examples, in which parts are by weight, are given for purpose of illustration.

EXAMPLE 1

Preparation of 2-(pentafluorophenyl)hexafluoroisopropanol

A Grignard reagent was prepared by placing 2 parts of magnesium metal and a crystal of iodine in 44 parts of anhydrous diethyl ether in a reaction vessel, and 1 part of pentafluorobromobenzene was added thereto. The mixture was heated at about 35° C. for about 15 minutes, and 19 parts of pentafluorobromobenzene in 22 parts of anhydrous diethyl ether were added over a period of 1 hour, during which time the reaction mixture refluxed spontaneously. The mixture was stirred for ½ hour, and 14 parts of hexafluoroacetone were then introduced with stirring at 0° C. over 1 hour. After standing overnight, the reaction mixture was poured into an ice-HCl mixture. The resulting organic layer was extracted with methylene chloride, washed with water, dried and distilled. A yield of 13.4 parts of 2-(pentafluorophenyl)hexafluoroisopropanol was obtained as product.

The product, a colorless liquid, had a boiling point of 162–4° C., a refractive index $n_D^{27}$ of 1.3803 and a surface tension of 27.6 dynes per cm.$^2$. The infrared absorption curve of the product exhibited $CF_3$ group absorption at 8.0 and 8.7 microns, aromatic ring absorption at 6.5 microns and a strong hydroxyl absorption band at 2.7 microns.

EXAMPLE 2

The procedure of Example 1 was followed using 4 parts of magnesium, 40 parts of pentafluorobromobenzene, 110 parts of anhydrous diethyl ether and 29 parts of hexafluoroacetone. A yield of 22.2 parts of 2-(pentafluorophenyl)hexafluoroisopropanol was obtained.

The product possessed a boiling point of 162–4° C. and a refractive index $n_D^{27}$ of 1.3796.

EXAMPLE 3

The procedure of Example 1 was repeated using 13 parts of magnesium, 123.5 parts of pentafluorobromobenzene, 444 parts of tetrahydrofuran and 85 parts of hexafluoroacetone. The Grignard reagent was prepared at 55° C. in 2½ hours, and the hexafluoroacetone was added over a 35 minutes period. The reaction mixture was worked up as in Example 1, except that the reaction product was treated with sulfuric acid to completely remove the tetrahydrofuran. 111 parts of 2-(pentafluorophenyl)hexafluoroisopropanol having a boiling point of 162–4° C. were obtained.

EXAMPLE 4

The procedure of Example 1 was repeated using 30 parts of magnesium, 237 parts of pentafluorobromobenzene and 220 parts of anhydrous diethyl ether. 222 parts of tetrahydrofuran were added to the Grignard reagent, and about 200 parts of hexafluoroacetone were added with stirring and cooling at 37–40° C. 274 parts of 2-(pentafluorophenyl)hexafluoroisopropanol having a boiling point of 155–65° C. were obtained.

The product had the following elemental analysis:

|  | Hydrogen, percent | Fluorine, percent |
|---|---|---|
| Calculated | 0.3 | 62.8 |
| Found | 0.4* | 61.5* |

*By nuclear magnetic resonance.

EXAMPLE 5

Preparation of 2-(pentafluorophenyl)hexafluoroisopropyl acrylate 32 parts of 2-(pentafluorophenyl)hexafluoroisopropanol, 50 parts of trifluoroacetic anhydride and 15 parts of acrylic acid were mixed in a reaction vessel and heated at reflux for 24 hours. The reaction mixture was cooled, washed 5 times with portions of cold 10% aqueous sodium hydroxide solution, dried over sodium sulfate and distilled. Three fractions were taken, each containing 2-(pentafluorophenyl)hexafluoroisopropyl acrylate, as follows:

Fraction 1: B.P. 72–80° C. (25 mm.)—50% pure [1]
Fraction 2: B.P. 81–92° C. (25 mm.)—80% pure [1]
Fraction 3: B.P. 93–102° C. (25 mm.)—60% pure [1]

[1] By vapor phase chromatography.

The infrared absorption curve of the acrylate ester exhibited aromatic ring absorption at 6.05 microns, $CF_3$ group absorption at 8.0 and 8.7 microns and carbonyl absorption at 5.9 microns.

EXAMPLE 6

Preparation of homopolymer of 2-(pentafluorophenyl) hexafluoroisopropyl acrylate 5.9 parts of Fraction 2 of Example 5 and 30 parts of 1.65% "Duponol W.E." (an emulsifier of the alcohol sulfate type) were mixed in a reaction vessel thoroughly purged with nitrogen. The mixture was heated to 80° C., and 0.05 part of potassium persulfate was added. After heating at 80° C. for about 3 hours, the reaction was near completion. The mixture was then heated overnight at 80° C., cooled and diluted with water to form an aqueous emulsion. Part of the aqueous emulsion was poured into methanol, and homopolymer of 2-(pentafluorophenyl)hexafluoroisopropyl acrylate was recovered by filtration as a powder.

EXAMPLE 7

2-(pentafluorophenyl)hexafluoroisopropyl methacrylate and homopolymer thereof

The procedure of Example 5 is carried out using methacrylic acid instead of acrylic acid to obtain 2-(pentafluorophenyl)hexafluoroisopropyl methacrylate. The methacrylate is then converted to its homopolymer by the procedure of Example 6.

EXAMPLE 8

Water repellency test

A portion of the polymer emulsion described in Example 6 was impregnated on cotton print fabric by total immersion. Excess solution was blotted off on paper toweling, and the fabric was air dried and heat set for 5 minutes at 160° C. Water repellency of the polymer was then determined by a standard spray method (ASTM D–583–58). A value of 80 was obtained by the test method, showing that the treated cloth possessed water repellency properties.

While the above describes the preferred embodiments of this invention, it will be understood that departures may be made therefrom within the scope of the specification and claims.

We claim:
1. A compound having the general formula:

$$\begin{array}{c} \text{OR} \\ | \\ F_3C-C-CF_3 \\ | \\ C \\ \diagup \diagdown \\ F-C \quad C-F \\ \| \quad \| \\ F-C \quad C-F \\ \diagdown \diagup \\ C \\ | \\ F \end{array}$$

wherein R is a member selected from the group consisting of hydrogen, acrylyl and methacrylyl.
2. 2-(pentafluorophenyl)hexafluoroisopropanol.
3. Perfluoro-α,α-dimethylbenzyl alcohol.
4. 2-(pentafluorophenyl)hexafluoroisopropyl acrylate.
5. 2 - (pentafluorophenyl)hexafluoroisopropyl methacrylate.

6. A homopolymer derived from an ester having the general formula:

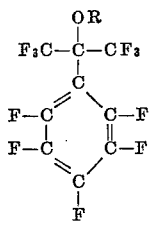

wherein R is a member selected from the group consisting of acrylyl and methacrylyl.

7. A homopolymer derived from 2-(pentafluorophenyl) hexafluoroisopropyl acrylate.

8. A homopolymer derived from 2-(pentafluorophenyl) hexafluoroisopropyl methacrylate.

9. Textiles which have been impregnated with a homopolymer specified in claim 6 so as to have been rendered water repellent.

References Cited

UNITED STATES PATENTS 3,265,746   8/1966   Wall et al. _____ 260—618D
3,385,901   5/1968   Tamborski et al. ___ 260—618D HARRY WONG, JR., Primary Examiner U.S. Cl. X.R.

117—139.5; 204—159.22, 159.23; 260—29.6, 486, 618